3,483,170
CARBOXYLIC COPOLYMER-CYCLIC ETHER
REACTION PRODUCTS
Pieter H. van der Meij and Arnold A. Buitelaar, Amsterdam, Netherlands, assignors to Shell Oil Company, New York, N.Y., a corporation of Delaware
No Drawing. Filed Sept. 27, 1966, Ser. No. 582,235
Claims priority, application Netherlands, Nov. 9, 1965, 6514506
Int. Cl. C08f 27/00
U.S. Cl. 260—78.5     15 Claims

ABSTRACT OF THE DISCLOSURE

An improved process is disclosed for preparing polymeric compounds having free alcohol groups and which are free of gel, which comprises polymerizing a mixture containing (1) at least one ethylenically unsaturated carboxylic acid, (2) a salt of a basic compound and an unsaturated carboxylic acid, and optionally (3) one or more alkyl esters of unsaturated carboxylic acids, and reacting said polymer with ethylene oxide, trimethylene oxide or derivatives of ethylene oxide and trimethylene oxide.

---

The invention relates to an improved process for the preparation of polymeric compounds having free alcohol groups which are free of gel.

Specifically the invention relates to an improved process for preparing polymeric compounds having free alcohol groups which is free of gel which comprises forming a copolymer of (1) at least one ethylenically unsaturated carboxylic acid, such as methacrylic acid, and (2) a salt of a basic compound and an unsaturated carboxylic acid, such as, for example, lithium methacrylate, and then reacting the resulting copolymer with a cyclic ether, such as ethylene oxide.

The preparation of polymeric compounds having free OH groups from the corresponding polymeric compounds containing free carboxylic groups and reaction of this acidic polymer with a cyclic ether in the presence of a basic compound is known from British patent specification 771,569.

It has been found that in some cases, upon application of this process, polymers containing gel-like products are obtained. In certain applications, for example, when the polymers are used as lubricating-oil additives, the presence of these gel-like compounds is undesirable.

It has now been found that the desired polymers containing free alcohol groups can be prepared without the formation of gel-like products if the reaction of the acidic polymer with the cyclic ether is carried out, not as usual, in the presence of a basic compound as the catalyst, but this catalyst is previously incorporated in the acidic polymer. This incorporation of the catalyst in the acidic polymer can be achieved by including in the mixture of monomers from which the acidic polymer is prepared and which already contains one or more unsaturated carboxylic acids, also one or more salts of basic compounds and unsaturated carboxylic acids. The acidic copolymer obtained by polymerization of this monomer mixture can then be reacted with a cyclic ether without the aid of any additional catalyst.

The invention thus relates to a process for the preparation of a polymeric compound having free alcohol groups which comprises preparing a copolymer from a monomer mixture containing at least one unsaturated carboxylic acid and a salt of a basic compound and an unsaturated carboxylic acid, and reacting this copolymer with a cyclic ether.

An added advantage of the process according to the invention over that described in the aforesaid British patent specification 771,569 is the appreciably shorter duration of the reaction between the acidic copolymer and the cyclic ether. In the British patent specification a reaction time of 69 hours is applied at a temperature of 130° C., whereas as appears from the examples of the process according to the invention, a reaction time of as little as 10 hours, at a temperature of 110° C., is quite sufficient.

The unsaturated carboxylic acids applicable as monomers in the present invention may be monobasic or polybasic unsaturated carboxylic acids. Examples of such unsaturated carboxylic acids include acrylic acid, methacrylic acid, fumaric acid and maleic acid. The monomer mixture may contain one or several unsaturated carboxylic acids. The preferred starting material is a monomer mixture in which, as an unsaturated carboxylic acid, a monobasic ethylenically unsaturated carboxylic acid containing up to 8 carbon atoms, preferably methacrylic acid, is present.

As salts of basic compounds and unsaturated carboxylic acids, salts derived from the unsaturated carboxylic acid present as such in the monomer mixture or salts of any other unsaturated carboxylic acids may be used. It is preferred to employ an embodiment of the invention that uses a salt derived from an unsaturated carboxylic acid already present in the monomer mixture. As with the unsaturated carboxylic acids themselves, one or several salts of unsaturated carboxylic acids may be used. If a mixture of salts of unsaturated carboxylic acids is used the difference between one salt and another may occur in the part derived from the unsaturated carboxylic acid or in the part derived from the basic compound. The preferred starting material is a monomer mixture containing a salt derived from an unsaturated monobasic carboxylic acid, preferably from methacrylic acid.

Eligible basic compounds from which the salts of the unsaturated carboxylic acids may be derived include alkali metals, alkali metal oxides, alkali metal hydroxides, alkali metal hydrides, alkaline-earth metals, alkaline-earth metal oxides, alkaline-earth metal hydroxides and nitrogenous organic compounds such as trimethylamine, triethylamine, N-methylmorpholine, pyridine, quinoline, and $\beta$-picoline. The preferred salts of basic compounds and unsaturated carboxylic acids are alkali metal salts of unsaturated carboxylic acids, in particular, lithium salts. Very good results have been obtained when using lithium methacrylate.

The ratio between the quantities of unsaturated carboxylic acid and unsaturated carboxylic salt present in the monomer mixture may vary within wide limits. Good results can be obtained using 0.01 to 0.10 mole of carboxylic salt per mole of unsaturated carboxylic acid. The preferred monomer mixtures are those containing 0.02 to 0.06 mole of carboxylic salt per mole of unsaturated carboxylic acid.

The monomer mixture used as starting material in the preparation of the polymers according to the invention may, in addition to unsaturated carboxylic acids and salts of basic compounds and unsaturated carboxylic acids, also contain one or more other olefinically unsaturated compounds. Examples of olefinically unsaturated monomers which may moreover be present in the monomer mixture include vinyl esters of saturated monocarboxylic acids such as vinyl palmitate and vinyl stearate; allyl esters of saturated monocarboxylic acids such as allyl laurate and allyl myristate; alkyl esters of unsaturated monocarboxylic acids such as lauryl acrylate and stearyl methacrylate; dialkyl esters of unsaturated dicarboxylic acids such as dilauryl fumarate and distearyl maleate; mono-olefins such as ethene and styrene; diolefins such as butadiene and isoprene.

The process according to the invention is particularly suitable for the preparation of copolymers from a monomer mixture which, in addition to an unsaturated carboxylic acid and a salt of a basic compound and an unsaturated carboxylic acid, also contains one or more alkyl esters of unsaturated carboxylic acids, in particular esters of methacrylic acid and alcohols having 6 to 30 carbon atoms.

Preparation of the acidic copolymers can be achieved by dissolving the monomers in a solvent and effecting copolymerization at an elevated temperature in the presence of a free radical-former. The ratio in which the monomers are incorporated in the growing copolymer molecule depends on the reactivities of the monomers involved. Where these reactivities differ, the more reactive monomer will be incorporated in the growing copolymer faster than the less reactive monomer, with the result that the molar ratio between the monomers incorporated will be different from that of the monomers in the starting mixture, while moreover the composition of the copolymer will lack homogeneity. In such cases it is usual for the molar ratio of the more reactive to the less reactive monomer in the starting material to be so chosen that it is lower than the ratio required in the copolymer, and for a portion of the more reactive monomer to be added according to a set program during the copolymerization. It is known, however, that programmed copolymerization, in practice, has certain disadvantages attached to it.

However, if the more reactive monomer is an unsaturated carboxylic acid, copolymerization with less reactive monomers can in many cases be accomplished without any need for programming, if the copolymerization is carried out in the presence of a substance that will associate with the unsaturated carboxylic acid.

Such is the case in the process according to the present invention if, in addition to an unsaturated carboxylic acid and a salt of a basic compound and an unsaturated carboxylic acid, the monomer mixture also contains monomers that are less reactive than the unsaturated carboxylic acid, such as alkyl esters of unsaturated carboxylic acids. If a substance that will associate with the unsaturated carboxylic acid is used, then the rates of incorporation of the monomers will become the same and the monomers will be incorporated in the same molar ratio as that between the monomers in the starting mixture, thus making programming superfluous.

Eligible associated substances include, for example, aliphatic compounds containing an oxygen atom linked to carbon, as alcohols, ethers, ketones and carboxylic acids. Aliphatic alcohols such as methanol, ethanol, propanol and isopropanol, especially methanol, are preferred.

The solvent in which the copolymerization reaction is effected may be, for example, benzene, toluene or xylene.

The catalysts employed in the polymerization may be any free radical yielding catalyst. Examples of such catalysts include the azobisnitriles, such as azodiisobutyronitrile, peroxides, such as benzoyl peroxide, succinyl peroxide, dilauryl peroxide, tertiary alkyl hydroperoxide, ditertiary butyl peroxide, per-acids, such as persulfuric acid, peracetic acid, per-salts, such as potassium persulfate, and the like, and mixtures thereof. The amount of the catalyst may vary over a wide range, but preferably between .01% to 5% by weight of the monomers involved.

The temperature employed in the polymerization may vary over a wide range depending on the type of catalyst employed, monomers, etc. Preferred temperatures range from about 40° C. to about 150° C., and more preferably between 50° C. and 100° C. Atmospheric, reduced, or super-atmospheric pressures may be employed as desired.

The cyclic ethers suitable for use in the present process have in the ring two or three carbon atoms in addition to an oxygen atom. Examples of such cyclic ethers are ethylene oxide, trimethylene oxide and derivatives of ethylene oxide and trimethylene oxide. Ethylene oxide is preferred.

The reaction of the acidic copolymer with the cyclic ether may take place at room temperature but is preferably effected at an elevated temperature at, for example, a temperature between 95 and 130° C. If the final product is liquid, then the reaction may be carried out without using a solvent. If a solvent is used, this may be either a polar or a non-polar solvent. There is a tendency, in a non-polar solvent in particular, for the polymer containing free carboxylic groups to form intra-molecular hydrogen bridges, causing a considerable increase in viscosity. Consequently, the reaction with the cyclic ether is preferably carried out in the presence of a polar compound that will prevent the formation of intra-molecular hydrogen bridges. For this purpose a low-boiling alcohol—methanol, ethanol, propanol or isopropanol, for example—is very suitable. Methanol is preferred. A very suitable medium in which to effect the reaction is a mixture of a low-boiling alcohol, such as methanol, and an aromatic hydrocarbon, such as toluene. Mixtures containing 20 to 30 percent by weight methanol and 80 to 70 percent by weight toluene have given good results.

In the preparation of the polymeric compounds containing free alcohol groups according to the invention, the acidic copolymers need not be isolated before being reacted with the cyclic ether. The cyclic ether can be added directly to the mixture resulting from the polymerization reaction.

In the preparation of copolymers from monomer mixtures containing unsaturated carboxylic acids and less reactive monomers, using an aliphatic alcohol as the associative compound, this one-step process has the added advantage that the alcohol present in the reaction mixture will at the same time prevent the formation of intra-molecular hydrogen bridges in the acidic copolymer. As reaction medium it is preferred to use a mixture of an aliphatic alcohol and an aromatic hydrocarbon. Very good results can be obtained by polymerizing a mixture of methacrylic acid, lithium methacrylate and esters of methacrylic acid and aliphatic alcohols having 6 to 30 carbon atoms in a mixture of methanol and toluene, and adding ethylene oxide to the resulting reaction mixture.

The invention is now illustrated by the following examples. Unless otherwise indicated, parts in the examples are parts by weight.

EXAMPLE I

A pentadecyl/hydroxyethyl methacrylate copolymer according to the invention was prepared by copolymerization of pentadecyl methacrylate with methacrylic acid and lithium methacrylate, followed by ethoxylation. The procedure was as follows.

380.7 parts pentadecyl methacrylate, 42.8 parts methacrylic acid and 1.53 parts lithium methacrylate were taken up in a mixture of 170 parts methanol and 405 parts toluene and polymerized with the aid of 0.50 part azodiisobutyronitrile. The temperature of the mixture during the polymerization reaction was 65° C. The reaction time was 20 hours. The percentage conversion was 96%. Of the mixture thus resulting from the polymerization reaction 1,000 parts was treated at 110° C. with 30.4 g. ethylene oxide.

The increase in the percentage conversion with time, expressed as the percentage of the acid groups ethoxylated after a given period of time, is recorded in the following table.

| Hours, after: | Percent |
|---|---|
| 1 | 39 |
| 2 | 62 |
| 4 | 84 |
| 8 | 99 |
| 10 | 100 |

The result was a solution of pentadecyl/hydroxyethyl methylacrylate copolymer in methanol-toluene, in which no gel-like compounds occurred.

EXAMPLE II

An octyl/lauryl/stearyl/hydroxyethyl methacrylate copolymer according to the invention was prepared by copolymerization of octyl methacrylate with lauryl methacrylate, stearyl methacrylate, methacrylic acid and lithium methacrylate, followed by ethoxylation. The procedure was as follows.

42.5 parts octyl methacrylate, 55 parts lauryl methacrylate, 73 parts stearyl methacrylate, 13.2 parts methacrylic acid and 0.75 parts lithium methacrylate were taken up in a mixture of 61 parts methanol and 188.5 parts toluene and polymerized with the aid of 0.43 part benzoyl peroxide. The temperature of the mixture during the polymerization reaction was 77° C.; the reaction time was 20 hours. The percentage conversion was 98%.

The mixture resulting from the polymerization reaction was treated at 110° C. with 13.55 parts ethylene oxide.

The increase in the percentage conversion with time, expressed as the percentage of the acid groups ethoxylated after a given period of time, is recorded in the following table.

| Hours, after: | Percent |
|---|---|
| 1 | 43 |
| 3 | 73 |
| 5 | 91 |
| 8 | 100 |

The result was a solution of octyl/lauryl/stearyl/hydroxyethyl methacrylate copolymer in methanol-toluene, in which no gel-like compound occurred.

EXAMPLE III

Example I is repeated with the exception that the pentadecyl methacrylate is replaced with a 1:1 mixture of lauryl methacrylate and stearyl methacrylate. Related results are obtained.

EXAMPLE IV

Example I is repeated with the exception that the methacrylic acid is replaced with acrylic acid. Related results are obtained.

EXAMPLE V

Example I is repeated with the exception that the pentadecylmethacrylate is replaced with lauryl methacrylate. The result is a solution of lauryl/hydroxyethyl methacrylate copolymer in methanol-toluene in which no gel-like compounds occur.

EXAMPLE VI

Examples I to V are repeated with the exception that the lithium methacrylate is replaced with lithium acrylate. Related results are obtained.

EXAMPLE VII

Example I is repeated with the exception that the lithium methacrylate is replaced with each of the following:
A 1:1 mixture of lithium carylate and lithium fumarate, 1:1 mixture of lithium methacrylate and lithium acrylate. Related results are obtained.

EXAMPLE VIII

Example I is repeated using only methacrylic acid and lithium methacrylate. The result is a solution of methacrylic acid polymer in methanol-toluene in which no gel-like compounds occur.

We claim as our invention:
1. A process for the preparation of polymeric compounds containing free alcoholic OH Groups which comprises polymerizing a mixture containing (1) at least one ethylenically unsaturated carboxylic acid having up to 8 carbon atoms, and (2) a salt of a basic compound and a monobasic ethylenically unsaturated carboxylic acid, in the ratio of 0.01 to 0.10 mole of salt per mole of acid and without additional catalyst reacting the resulting copolymer with a cyclic ether from the group consisting of ethylene oxide and trimethylene oxide in the ratio of less than about 75 parts of ether per 1000 parts of polymer.

2. A process as in claim 1 wherein the salt is a salt of a monobasic ethylenically unsaturated carboxylic acid containing up to 8 carbon atoms.

3. A process as in claim 1 wherein the unsaturated carboxylic acid is methacrylic acid.

4. A process as in claim 1 wherein the salt is an alkali metal salt of a monobasic ethylenically unsaturated carboxylic acid containing up to 8 carbon atoms.

5. A process as in claim 1 wherein the salt is lithium methacrylate.

6. A process as in claim 1 wherein the monomer mixture contains from 0.02 to 0.06 mole of the salt per mole of unsaturated carboxylic acid.

7. A process as in claim 1 wherein the monomer mixture also contains about 900 parts per 100 parts of combined acid and salt monomers of one or more alkyl esters of an ethylenically unsaturated carboxylic acid containing up to 8 carbon atoms.

8. A process as in claim 1 wherein the monomer mixture also contains about 900 parts per about 100 parts of combined acid and salt monomers of one or more esters of methacrylic acid and aliphatic alcohols having from 6 to 30 carbon atoms.

9. A process as in claim 8 wherein the copolymerization reaction is effected in the presence of aliphatic compounds from the group consisting of alcohols, ethers, ketones and carboxylic acids.

10. A process as in claim 8 wherein the copolymerization reaction is effected in the presence of methanol.

11. A process as in claim 1 wherein the cyclic ether is ethylene oxide.

12. A process as in claim 1 wherein the reaction with the cyclic ether is effected at a temperature between 95° C. and 130° C. and in the presence of an aliphatic alcohol.

13. A process as in claim 1 wherein the reaction with the cyclic ether is effected in a mixture of 20 to 30% by weight methanol and 80% to 70% by weight of toluene.

14. A process as in claim 1 wherein the unsaturated acid is methacrylic acid, the salt is lithium methacrylate and the mixture contains one or more alkyl esters of methacrylic acid and a solvent made up of methanol and toluene, and that the cyclic ether used in the subsequent reaction is ethylene oxide.

15. A product according to the process of claim 1.

References Cited

FOREIGN PATENTS 771,569  4/1957  Great Britain.

JOSEPH L. SCHOFER, Primary Examiner
S. M. LEVIN, Assistant Examiner

U.S. Cl. X.R.
260—29.1, 80.3, 80.7, 80.8